United States Patent [19]

Brazil

[11] Patent Number: 5,444,323
[45] Date of Patent: Aug. 22, 1995

[54] ACOUSTIC BROOM

[76] Inventor: Harry Brazil, Main Highway, P.O. Box 463, Bay Roberts, Newfoundland A0A 1G0, Canada

[21] Appl. No.: 114,933

[22] Filed: Sep. 2, 1993

[30] Foreign Application Priority Data

Oct. 27, 1992 [CA] Canada .................................. 2081485

[51] Int. Cl.6 ......................................... H01L 41/08
[52] U.S. Cl. ...................................... 310/328; 310/369
[58] Field of Search ............... 310/328, 334, 336, 337, 310/340, 369; 367/141, 142, 153, 155, 166, 171, 173

[56] References Cited

U.S. PATENT DOCUMENTS

| | | | |
|---|---|---|---|
| 2,257,997 | 10/1940 | Barnes | 252/349 |
| 2,405,187 | 8/1946 | Benioff | 310/334 |
| 2,766,881 | 10/1956 | Westervelt et al. | 209/138 |
| 2,797,399 | 6/1957 | Camp et al. | 310/337 |
| 2,961,637 | 11/1960 | Camp | 310/337 |
| 2,989,725 | 6/1961 | Miller | 310/340 |
| 3,150,347 | 9/1964 | Hanish | 310/337 |
| 3,952,216 | 4/1976 | Madison et al. | 310/334 |
| 4,032,438 | 6/1977 | Koblanski | 210/19 |
| 4,126,547 | 11/1978 | Kuris | 210/19 |
| 4,222,868 | 9/1980 | Kuris | 210/748 |
| 4,235,711 | 11/1980 | Koblanski | 210/748 |
| 4,308,006 | 12/1981 | Koblanski | 431/1 |
| 4,316,805 | 2/1982 | Faust et al. | 210/693 |
| 4,483,695 | 11/1984 | Covey, Jr. | 55/159 |

FOREIGN PATENT DOCUMENTS

| | | | |
|---|---|---|---|
| 451426 | 9/1948 | Canada . | |
| 0600243 | 6/1960 | Canada | 367/153 |
| 0873555 | 6/1971 | Canada | 367/155 |
| 886683 | 11/1971 | Canada . | |
| 1015288 | 8/1977 | Canada . | |
| 1065768 | 11/1979 | Canada . | |
| 1067709 | 12/1979 | Canada . | |
| 1129068 | 8/1982 | Canada . | |
| 1189707 | 7/1985 | Canada . | |
| 1283879 | 12/1985 | Canada . | |
| 1205021 | 5/1986 | Canada . | |
| 0128999 | 10/1980 | Japan | 310/334 |
| 0089375 | 4/1957 | Norway | 310/324 |
| 0749930 | 6/1956 | United Kingdom | 310/337 |

Primary Examiner—Thomas M. Dougherty
Attorney, Agent, or Firm—Victor Flores

[57] ABSTRACT

A novel acoustic broom is provided herein. The acoustic broom comprises an enclosed housing formed of a material which is transparent to wave energy, (e.g., acoustic energy, namely, a synthetic plastic material). A plurality of ceramic, plate-like wave energy (e.g., acoustic energy) generators are disposed within the housing. Each of these generators consists of a cylindrical sub-housing formed of material which is transparent to the wave energy, and each of the ceramic plate-like generators of the wave energy is secured within the cylindrical sub-housing. The circular ends of the cylindrical sub-housing are sealed. Operator means are actuatable to act upon the ceramic plate-like wave energy (e.g., acoustic energy) generators to generate and propagate the wave energy (e.g., the acoustic energy). These operator means usually comprises electrical energy means and electrical connections are provided from the ceramic plate-like wave energy (e.g., acoustic energy) generator to the electric operator.

15 Claims, 2 Drawing Sheets

ACOUSTIC BROOM

BACKGROUND OF THE INVENTION (i) Field of the Invention

This invention relates to a method and apparatus for use in cleaning oil spills. It is particularly related to separating the oil from water preparatory to the cleaning up of the oil spill.

(ii) Description of the Prior Art

The widely known and contentious problem of cleaning up an oil spill in a harbour or elsewhere has resulted in the development of a number of devices, many of which have not proven to be too effective. Water-borne oil is a difficult substance to contain and pick up. Conventional mechanisms developed for this purpose, e.g., rotating conveyors equipped with belts of fabric and lengthy floating booms capable of sweeping the water surface, have many disadvantages.

When oil is spilled into a harbour or other body of water, the most immediate problem is to contain the oil so that it will not spread to such an extent that it is not practical or worthwhile even to try to remove the spillage. Sometimes a floating boom is used in an attempt to stop the spread of such water-borne oil but the shear physical task of assembling a lengthy boom as is normally required, and of the maneuvering the boom into a position where it might be effective, results in a delay which can render the whole exercise futile. Furthermore, a boom can only be successfully employed when water conditions are ideal which seldom is the case.

The use of ultrasonic or acoustical energy for the purpose of breaking up an oil spill has been proposed in the patent literature. Thus, Canadian Patent No. 1,065,768, patented Nov. 6, 1979 by J. N. Koblanski provided a purported solution to the problem by using acoustic waves to develop the force needed to separate the oil from the water. That patentee provided apparatus for removing from the surface of a body of water by means of a transducer, with means for supporting the transducer immersed in water. Electrical means were provided for energizing the transducer to generate sound waves. Focusing means were provided which were constructed and arranged to provide a region of focus for the sound waves located generally above the focusing means. Collecting means supported by the supporting means were constructed and arranged to collect oil removed from the surface of the body of water in the approximate area of the region of focus.

Another purported solution was said to be provided in Canadian Patent No. 1,067,709 patented Dec. 11, 1979 by J. N. Koblanski. That patentee contemplated the use of acoustical energy to provide, in effect, a huge broom which can be wielded to sweep floating oil into a confined area from where it can more readily be picked up by other means. More specifically, such apparatus included a sound-producing device having a member capable of transmitting a shaped and intensified ray of vibrational energy. Support means supported the device, e.g., below the water surface, in a position to direct the ray of vibrational energy upwardly towards the floating oil at a selected grazing angle relative to the water surface. Means were provided for activating the sound producing device to generate the ray of vibrational energy and to produce a horizontally-elongated and vertically-flattened zone of vibrational energy capable of exerting a propelling force on the floating oil.

U.S. Pat. No. 4,126,547 patented Nov. 12, 1978 by A. Kuris provided an apparatus by means of which oil slicks on surface waters were dispersed by the exposure of the surface oils to ultrasonic energy to effectuate an homogenization of the oil and water to permit absorption of the oil within the total volume of water. In accordance with the patented invention, a device for homogenization of the oil into the body of water was obtained using an output radiator or ultrasonic motor for generating longitudinal vibrations of large displacement amplitude adapted to produce periodic perturbations in the oil, and reflecting means disposable in facing relation to the generating means, i.e., the output radiator. The oil to be dispersed was funnelled through the gap between the ultrasonic motor and the reflecting means for reflecting the vibrations back into the fluid medium consisting of the oil layer and water. The reflecting surface was spaced from the generating means output surface a distance such that the reflected vibrations were substantially in phase with the vibrations radiated into the fluid medium by the output radiator. In this manner, the displacement amplitude of the fluid medium perturbations were said to be increased for the release of oil particles into the fluid primarily by the selective entrainment characteristics of the viscous forces generated by the perturbating medium.

U.S. Pat. No. 4,222,868 patented Sep. 16, 1980 by A. Kuris provided a method for cleaning the oil slick wherein the oil slick was carried through a fluid medium with longitudinal vibrations of large displacement amplitude being applied to the fluid medium from one side of the oil slick to reduce the viscosity thereof. The vibrations were reflected at, or somewhat beyond, the other side of the oil slick back into the fluid medium with the reflected vibrations being substantially in phase with the applied longitudinal vibrations, thereby substantially increasing the displacement amplitude of the fluid medium perturbations. The frequency of the vibrations and the viscosity of the fluid were coordinately selected for the release of particles from the oil slick into the body of water primarily by the selective entrainment characteristics of the forces generated by the perturbating medium.

SUMMARY OF THE INVENTION (i) Aims of the Invention

The prior patents described above suffered the disadvantages of requiring: a specially-designed reflecting surface for the acoustical energy generated; the use of special support means to direct the ray of vibrational energy upwardly towards the floating oil at a particular angle; and the optional use of chemicals to aid in the absorption of the oil into a large body of water associated therewith.

Accordingly, one object of the present invention is to provide an improved system for removal of oil slicks under a variety of environmental conditions.

Another object of the present invention is to provide a system which includes means for generating ultrasonic vibrations capable of fracturing the oil into particles that may be easily swept from the surface of the water.

Yet another object of this invention is to provide a simple, durable, effective acoustical energy generator to provide a broom-like device to release oil from entrapment with water and to sweep floating oil into a confined area where it can more readily be picked up by other and conventional means.

(ii) Statements of Invention

The present invention provides an acoustic broom comprising: (a) an enclosed housing formed of material which is transparent to high-frequency wave energy; (b) a plurality of ceramic, plate-like generators of the wave energy within the housing, each of the ceramic, plate-like generators comprising a cylindrical sub-housing formed of a material which is transparent to the wave energy, each ceramic, plate-like generator of the wave energy being secured within the cylindrical sub-housing, and means sealing the circular ends of the cylindrical sub-housing; and (c) operator means to act upon the ceramic, plate-like generators to generate and propagate the high-frequency wave energy.

The present invention also provides an acoustic broom comprising: (a) a housing formed of a material which is transparent to acoustic energy; (b) a plurality of ceramic, plate-like acoustic energy generators within the housing, each of the ceramic plate-like acoustic energy generators comprising a cylindrical sub-housing formed of material which is transparent to the acoustic energy, each ceramic, plate-like generator of the acoustic energy being secured within the cylindrical sub-housing, and means sealing the circular ends of the cylindrical sub-housing; (c) operator means to act upon the ceramic plate-like acoustic energy generators to generate and propagate the acoustic energy; and (d) means connecting each the ceramic plate-like acoustic energy generator to the operator means.

The present invention also provides an acoustic boom comprising: (I) a plurality of interconnected sections, each section comprising a cylindrical head and a hydrodynamically-shaped tail, the sections being connected head-to-tail, the tail containing within its body an acoustic broom comprising either: (II) (a) an enclosed housing formed of material which is transparent to high-frequency wave energy; (b) a plurality of ceramic, plate-like generators of the wave energy within the housing, each of the ceramic, plate-like generators comprising a cylindrical sub-housing formed of material which is transparent to the wave energy, each ceramic, plate-like generator of the wave energy being secured within the cylindrical sub-housing, and means sealing the circular ends of the cylindrical sub-housing; and (c) operator means to act upon the ceramic, plate-like generators to generate and propagate the high-frequency wave energy; or (III) (a) a housing formed of material which is transparent to acoustic energy; (b) a plurality of ceramic, plate-like acoustic energy generators within the housing, each of the ceramic, plate-like acoustic energy generators comprising a cylindrical sub-housing formed of material which is transparent to the acoustic energy, each ceramic, plate-like generator of the acoustic energy being secured within the cylindrical sub-housing, and means sealing the circular ends of the cylindrical sub-housing; (c) operator means to act upon the ceramic, plate-like acoustic energy generators to generate and propagate the acoustic energy; and (d) means connecting each the ceramic plate-like acoustic energy generator to the operator means.

(iii) Features of the Invention

In one feature of the acoustic broom, the operator means comprises electrical UHF generation; and electrical connection means are included from each of the ceramic, plate-like wave energy generators to the operator means.

In another feature of the acoustic broom, the operator means comprises UHF generators; and the connecting means comprise electrically-conducting wires. Preferably in this feature, the electrically-conducting wires are connected in series-parallel relationship. Preferably, also, each ceramic, plate-like disc is secured in position by means of face-to-face contact with one of a respective pair of spaced-apart, electrically-conductive rings, the rings being electrically-connected to the wires. The vibrations are preferably in the range of about 1,000 to about 1,000,000 cycles/second, and the electrical source is preferably at about 500 KHz at up to about 1,000 watts power.

In yet another feature of the acoustic broom, the housing includes a cover of a material, (e.g., aluminum) which is opaque to the acoustic energy. Preferably, the material of the housing which is transparent to the acoustic energy is a synthetic plastic material, e.g., is NORYL TM, or polyvinyl chloride.

In yet another feature of the acoustic broom, a handle is secured to the cover.

BRIEF DESCRIPTION OF THE DRAWINGS

In the accompanying drawings.

Figure 1:
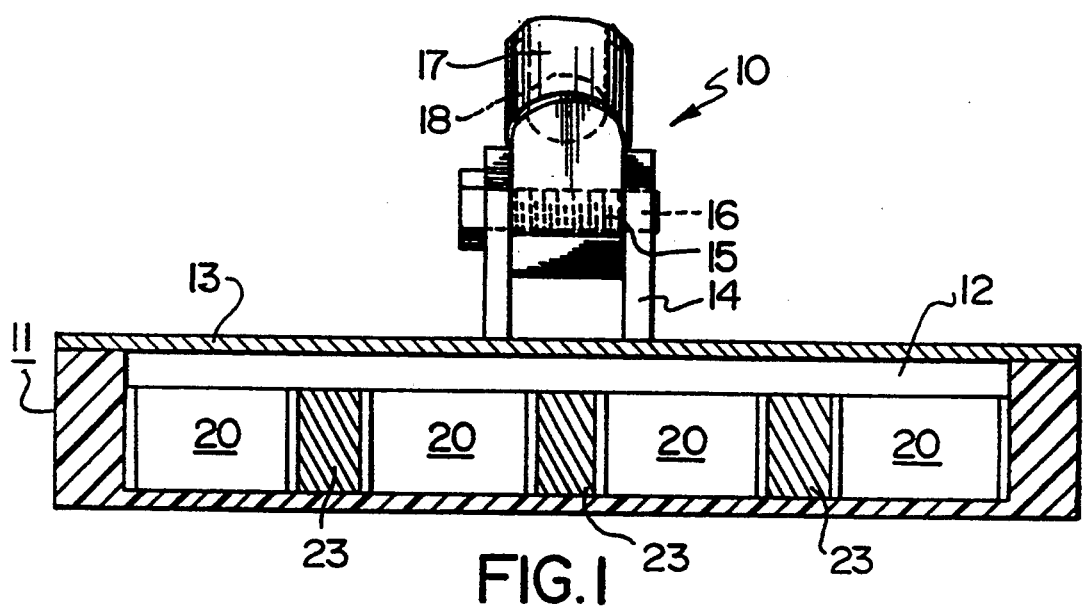
FIG. 1 is a side elevational view (with one panel open, for clarity) of a main housing of the acoustic broom of an embodiment of the present invention, showing one of the plurality of sub-housings therewithin which contain the acoustic wave generator.
Figure 2:
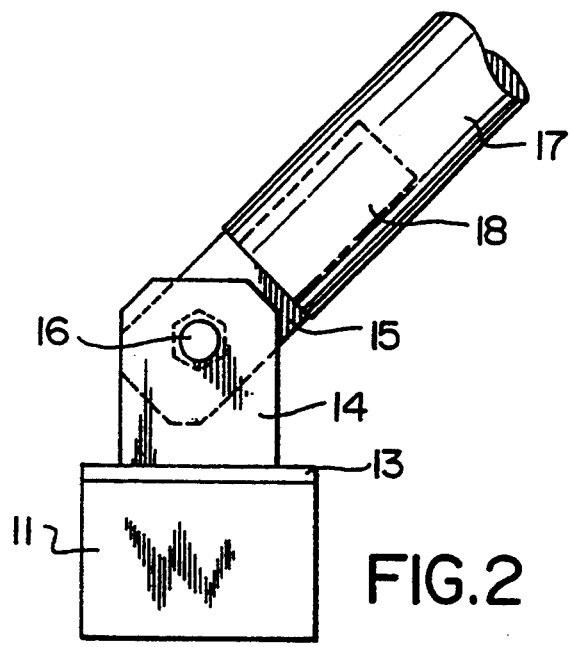
FIG. 2 is a side elevational view thereof.
Figure 3:
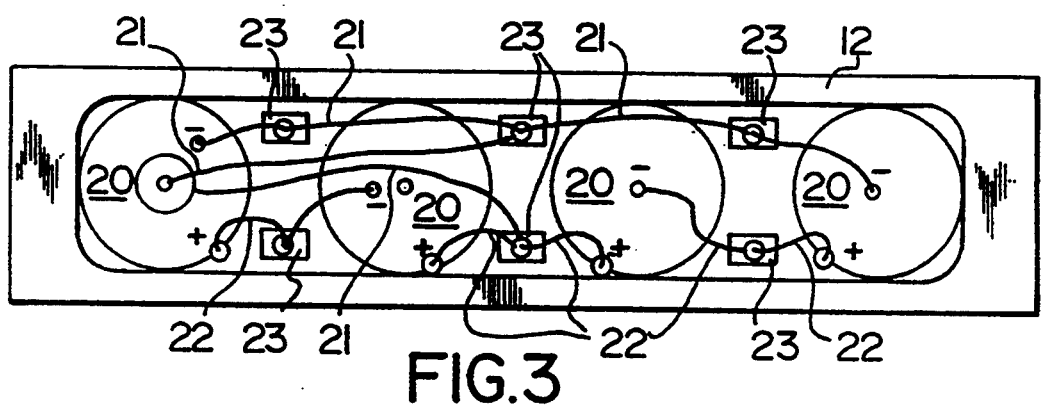
FIG. 3 is a top plan view (with the cover removed), of the acoustic broom of an embodiment of the present invention.

DESCRIPTION OF PREFERRED EMBODIMENTS (i) Description of FIGS. 1 to 3

As seen in FIGS. 1 to 3 of the drawings, the acoustic broom 10 includes an enclosed main housing 11 consisting of a rectangular parallelepiped 12 formed of a synthetic plastic material and which is adapted to be covered by a metallic cover 13. The synthetic plastic material is, e.g., that known by the trade-mark NORYL TM or polyvinylchloride, while the metallic cover 13 is preferably aluminum.

Connected to the cover 13 is a yoke 14 made of a synthetic plastic material, e.g., NORYL TM. This yoke 14 accepts a clevis 15, which also is made of a synthetic plastic material, e.g., NORYL TM. A bolt 16 is then threaded through the yoke 14 and clevis 15. A synthetic plastic, e.g., polyvinylchloride, handle 17 is then fastened to the cylinder end 18 of the clevis 15 to form an integral handle.

A plurality of cylindrical sub-housings 20, (which will be further described with reference to FIGS. 4 and 5), are then mounted within the main housing 11 in an upright orientation. The cylindrical sub-housings 20 are held in place in the main housing 11 by adhesive, e.g., an epoxy resin. The cylindrical sub-housings 20 are then wired in series-parallel relationship by wires 21, 22. The positive 21 and negative 22 leads are connected to the UHF generators 23.

For each cylindrical sub-housing 20, the positive lead 22 is secured, e.g., soldered, to the top aluminum plate 13, and the negative lead 21 is secured to a copper strap (not shown) provided around the bottom plate 29 of the sub-housing 20. This plate 29 is housed in the cylindrical sub-housing 20 and is held in place with an epoxy resin which forms the face of the sub-housing 20.

Figure 4:
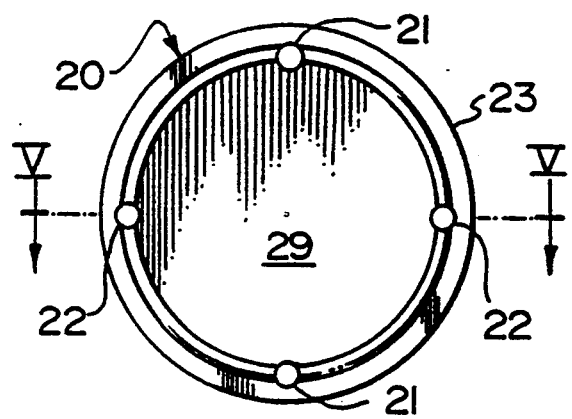
FIG. 4 is an end view of the sub-housing containing the acoustic generators forming an essential part of the acoustic broom of one embodiment of the present invention.
Figure 5:
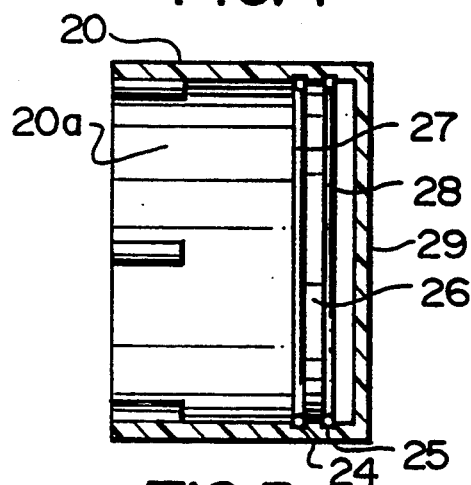
FIG. 5 is a section along the line V—V of FIG. 4 showing the acoustic generators forming an essential part of the acoustic broom of one embodiment of the present invention.

(ii) Description of FIGS. 4 and 5

As now seen in FIGS. 4 and 5, the sub-housing 20 is a cylindrical member formed of a suitable synthetic plastic material, e.g., NORYL TM or polyvinylchloride. The interior 20a of the cylindrical member 20 is provided with a pair of spaced-apart peripheral channels 24, 25. A ceramic disc acoustic wave generator 26 is disposed between the peripheral channels, which is held in place by conductor rings 27, 28 disposed in the respective channel 24, 25. One of the conductor rings 27 is adapted to be connected to a positive lead 21, while the other conductor ring 28 is adapted to be connected to a negative lead 22. Once the ceramic disc 26 is secured in place and the positive 21 and negative 22 leads are connected, the cylindrical sub-housing 20 is sealed, by means of plate 29 sealed in place by, e.g., an epoxy resin, to provide a water-tight hollow cylinder.

Figure 6:
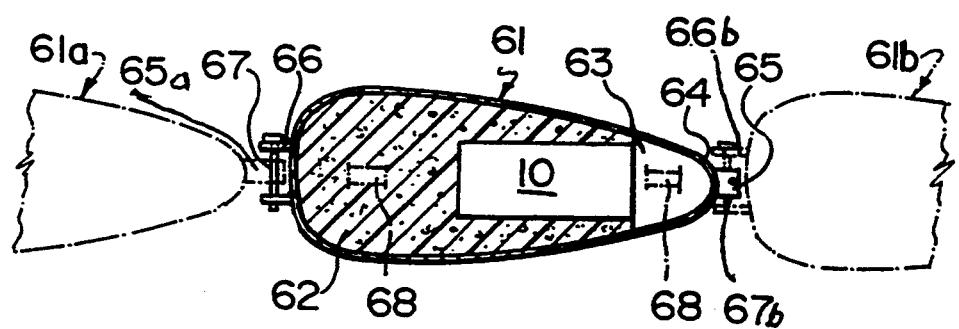
FIG. 6 is a side elevational view of an acoustic boom of another embodiment of the present invention incorporating an acoustic broom of an embodiment of the present invention.

(iii) Description of FIG. 6

As seen in FIG. 6, an acoustic boom 60 is provided which includes a cylindrical in cross-section boom section 61 which is provided internally with a synthetic plastic foam material 62 to provide a flotation effect. The cylindrical boom section 61 is provided with a hollow tail section 63. The hollow tail section 63 accommodates the acoustic broom 10 of an embodiment of the invention. The end 64 of the tail section 63 is provided with a clevis 65, and the cylindrical boom section 61 is provided at its front end with a socket 66. The tail section is also provided with handles 68.

Each section of the boom 60 (one such section being designated 61) is connected to another section by means of the socket 66/clevis 65 and a bolt 67 connection to form the desired length of the boom 60. Thus a second boom section (shown in phantom) 61a is secured to a boom section 61 by means of its clevis 65a being secured to the socket 66 by means of bolt 67. A third boom section 61b is secured to boom section 61 by means of its socket 66b being secured to clevis 65 by means of bolt 67b. An acoustic broom is thus installed in each of the tail section 63, 63a, 63b of the acoustic boom 60. The acoustic boom 60 can be used on any body of water, e.g., river, lake, harbour, etc.

DESCRIPTION OF EXAMPLES OF THE INVENTION

EXAMPLES

The acoustical brooms were tested by Environment Canada at the River Road Environmental Technology Centre's Oil Engineering Test Facility in Ottawa, Canada. The test tank measures 9.1 m (about 30 ft.) long, 3.0 m (about 10 ft.) wide, and has a 0.45 m (about 1½ ft.) working depth.

The power amplifier and wave generator were set up for a single acoustical broom 10. The power was limited to about 450 watts by the internal limitations of the amplifier; however, each individual broom can handle a maximum of about 750 to about 1,000 watts each.

An initial demonstration was performed in clear water, without any release of oil. Once the broom 10 was placed into the water, the power was switched on. Four significant jets of water were noticed, generated by the four emitters 20 within the single acoustical broom 10.

A current of 0.1 m/s (about ⅓ ft/s) was then established in the test tank. A 1250 ml (about 42 oz.) sample of Bunker-C fuel oil was released upstream of the broom. This heavy oil lingered at all levels within the water column. The acoustic jets could be seen pushing back a portion of the floating oil as it approached the device. The oil was held back.

The acoustic broom 10 was then positioned to demonstrate its capabilities in holding back neutrally buoyant globules of oil beneath the surface of the water. Again the oil was held back. The acoustic jets should be placed exactly in line with the globules to have optimal effect on them.

Approximately 500 ml (about 17 oz.) of a lighter oil were later released upstream. This oil floated on the surface. Once again, the brooms repelled oil. When the brooms were directed towards the stationary oil held in the backup conventional boom, the acoustical emitters, in fact, had a corralling effect which kept the oil together.

Next, a T-connector was coupled to the power amplifier to demonstrate the simultaneous use of two acoustical brooms to corral the oil. With both brooms connected, the amplifier overload continually switched off when exceeding 250 watts of power output. This was probably due to excessive amperage drawn from the amplifier at the lower resistance of the two brooms connected in parallel. Because a total of only 250 watts of power were available (only 125 watts each broom), the acoustical brooms had little effect on the floating oil slick in this portion of the test.

GENERALIZED DESCRIPTION OF OPERATIONS OF THE INVENTION

It has been demonstrated that acoustic emissions do have a driving effect on the water and oil they come into contact with. It is therefore particularly useful in a calm water environment, e.g., a harbour or a shoreline, where the oil may be relatively stationary.

A continuous bar emitter is desirable in order to create a uniform acoustical stream along a plane instead of a line, which may make it simpler to control the oil slick.

This acoustic broom raises heavy oil from the bottom of lakes, river beds, ocean floors, etc., with a water interface and diverts the oil using acoustic energy. The apparatus is intended to be used to remove a major part of the oil from the water.

This invention in one embodiment, can operate from a peripheral source of 500 KHz and at 1000 watts with a sine wave voltage.

An apparatus has thus been provided for ultrasonically separating contaminants from water which can be operated effectively in conjunction with conventional oil-spill clean-up apparatus to clear up an oil spill.

The high frequency wave-generating device comprises a body and a member capable of transmitting vibrational energy to a fluid medium, e.g., water. Preferably, the member used in this embodiment of the invention is a transducer consisting of a polarized ceramic dish having a face from which acoustical waves are emitted when the ceramic material is energized electrically. For this purpose, a suitable electric circuit connects the transducer to a source of high frequency alternating current.

In operation, the device is electrically energized so that the transducer produces acoustical waves. These acoustic waves are preferably ultrasonic waves, with the term "ultrasonic" defined to include vibrations in the range of about 1,000 to about 1,000,000 cycles per second. The vibrations necessary to achieve the desired ends of the present invention have a high frequency within the range between about 1,000 and about 1,000,000 cycles per second, and preferably of at least about 10,000 cycles per second, and an amplitude within the range of about 0.0001 inch so as to provide high peak accelerations, preferably of the order of at least about 1,000 G. Peak acceleration is equal to $4\pi^2 A/t^2$ in which A is the amplitude and t is 1/frequency. Thus, for example, with a frequency of about 20,000 cycles per second and an amplitude of about 0.002 inch, a peak acceleration of approximately 100,000 G is obtained, with "G" being the symbol representing gravitational acceleration, The power energy level is generally in the order of from about 1,000 to about 100,000 watts.

The sonic sweeping apparatus has been described as being equipped with an electrically energized transducer but it is believed that other sources of vibrational energy might be employed as well. For example, a hydrodynamic oscillator of conventional design has a sound producing transducer and associated parts can be used to produce the sound waves required for a sonic barrier used to sweep contaminating material floating on the surface of a body of water. Other alternatives include electro-acoustic transducers, e.g., electrostrictive and piezoelectric transducers.

While it is not desired to be bound by any theory, it is believed that the operation of the invention is based on the following hypothesis. When oil is floating on the water, at the surface the acoustic waves encounter the air above the water surface. This results in a zone of vibrational energy being developed which is directed to act upon the contaminating layer of oil, which then becomes a sound channel or wave guide for the energy. The zone is very narrow vertically, i.e., not much thicker than the oil layer itself. On the other hand, the zone is greatly elongated horizontally due to the normal propagation of the sound waves and the fact that the vibrational energy is trapped between the air and water surfaces. This creates a thin and fanned-out zone of vibrational energy which is largely confined to the oil layer and is further intensified as a result of being flattened so as to serve as a horizontally directed propelling force. The resultant force is applied in such a way that the zone of vibrational energy becomes a sonic or dynamic barrier for the oil or other contaminating substances. The oil encounters this sonic barrier and as a result, is brought to a halt. The oil starts to accumulate at the sonic barrier almost as if it had encountered a solid boom and eventually this steadily increasing accumulation must be removed as will be explained later.

The oil accumulated at the sound barrier is picked up by conventional pieces of equipment which can be used to remove the oil. One such device is a conventional weir-type oil skimmer which executes a skimming action. Other equipment presently available will slurp the oil up off the water surface but both the oil skimmers and the oil slurpers are effective only when the contaminating material is concentrated within a relatively small area as accomplished by use of the present invention.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:
1. An acoustic broom comprising:
  (a) an enclosed housing formed of a material which is transparent to high-frequency wave energy;
  (b) a plurality of ceramic, plate-like generators of said wave energy within said housing, each said ceramic plate-like generator comprising a cylindrical sub-housing formed of a material which is transparent to said wave energy, each said ceramic, plate-like generator of said wave energy being secured within said cylindrical sub-housing, and means sealing the circular ends of said cylindrical sub-housing;
  and (c) operator means to act upon said ceramic, plate-like generators to generate and propagate said high-frequency wave energy.

2. The acoustic broom of claim 1 wherein: said operator means comprises electrical UHF generation; and including electrical connection means from each of said ceramic plate-like wave energy generators to said operator means.

3. An acoustic broom comprising:
  (a) a housing formed of material which is transparent to acoustic energy;
  (b) a plurality of ceramic, plate-like acoustic energy generators within said housing, each said ceramic plate-like acoustic energy generator comprising a cylindrical sub-housing formed of a material which is transparent to said acoustic energy, each ceramic, plate-like generator of said acoustic energy being secured within said cylindrical sub-housing, and means sealing the circular ends of said cylindrical sub-housing;
  (c) operator means to act upon said ceramic, plate-like acoustic energy generators to generate and propagate said acoustic energy;
  and (d) means connecting each said ceramic plate-like acoustic energy generator to said operator means.

4. The acoustic broom of claim 3 wherein: said operator means comprises UHF generators; and wherein said connecting means comprise electrically-conducting wires.

5. The acoustic broom of claim 4 wherein said electrically-conducting wires are connected in series-parallel relationship.

6. The acoustic broom of claim 4 wherein each said ceramic, plate-like disc is secured in position by means of face-to-face contact with one of a respective pair of spaced-apart, electrically-conductive rings, said rings being electrically-connected to said wires.

7. The acoustic broom of claim 4 wherein said vibrations are in the range of about 1,000 to about 1,000,000 cycles/second.

8. The acoustic broom of claim 4 wherein the electrical source is at about 500 KHz at up to about 1,000 watts power.

9. The acoustic broom of claim 3 wherein said acoustic energy generator comprise four upright sub-housings within said housing.

10. The acoustic broom of claim 3 wherein said housing includes a cover of a material which is opaque to said acoustic energy.

11. The acoustic broom of claim 3 wherein material of said housing which is transparent to said acoustic energy is a synthetic plastic material.

12. The acoustic broom of claim 11 wherein said synthetic plastic material is NORYL TM, or polyvinyl chloride.

13. The acoustic broom of claim 10 wherein said material which is opaque to said acoustic energy is aluminum.

14. The acoustic broom of claim 10 including a handle secured to the cover.

15. An acoustic boom comprising:
(I) a plurality of interconnected sections, each section comprising a cylindrical head and a hydrodynamically-shaped tail, said sections being connected head-to-tail, said tail containing within its body an acoustic broom comprising either:
(II) (a) an enclosed housing formed of material which is transparent to high-frequency wave energy; (b) a plurality of ceramic, plate-like generators of said wave energy within said housing, each said ceramic, plate-like generator comprising a cylindrical sub-housing formed of a material which is transparent to said wave energy, each ceramic, plate-like generator of said wave energy being secured within said cylindrical sub-housing, and means sealing the circular ends of said cylindrical sub-housing; and (c) operator means to act upon said ceramic, plate-like generators to generate and propagate said high-frequency wave energy;
or (III) (a) a housing formed of material which is transparent to acoustic energy; (b) a plurality of ceramic, plate-like acoustic energy generators within said housing, each said ceramic, plate-like acoustic energy generator comprising a cylindrical sub-housing formed of material which is transparent to said acoustic energy, each ceramic, plate-like generator of said wave energy being secured within said cylindrical sub-housing, and means sealing the circular ends of said cylindrical sub-housing; (c) operator means to act upon said ceramic, plate-like acoustic energy generators to generate and propagate said acoustic energy; and (d) means connecting each said ceramic, plate-like acoustic energy generator to said operator means.

* * * * *